US012013594B2

(12) United States Patent
Escalier et al.

(10) Patent No.: US 12,013,594 B2
(45) Date of Patent: Jun. 18, 2024

(54) METHOD FOR DETECTING A PROBABLE ERROR IN A SET OF DATA RELATIVE TO A WEARER AND/OR A FRAME CHOSEN BY THE WEARER

(71) Applicant: Essilor International, Charenton-le-Pont (FR)

(72) Inventors: Guilhem Escalier, Charenton-le-Pont (FR); Pascal Allione, Charenton-le-Pont (FR)

(73) Assignee: Essilor International, Charenton-le-pont (FR)

( * ) Notice: Subject to any disclaimer, the term of this patent is extended or adjusted under 35 U.S.C. 154(b) by 1541 days.

(21) Appl. No.: 16/313,376

(22) PCT Filed: Jun. 30, 2017

(86) PCT No.: PCT/EP2017/066366
§ 371 (c)(1),
(2) Date: Dec. 26, 2018

(87) PCT Pub. No.: WO2018/002352
PCT Pub. Date: Jan. 4, 2018

(65) Prior Publication Data
US 2020/0183194 A1    Jun. 11, 2020

(30) Foreign Application Priority Data

Jun. 30, 2016 (EP) .................................. 16305820

(51) Int. Cl.
*G02C 13/00* (2006.01)
*G01M 11/08* (2006.01)
*G06F 16/23* (2019.01)

(52) U.S. Cl.
CPC ........... *G02C 13/005* (2013.01); *G01M 11/08* (2013.01); *G06F 16/2365* (2019.01)

(58) Field of Classification Search
CPC ..... G02C 13/005; G02C 7/027; G01M 11/08; G06F 16/2365
(Continued)

(56) References Cited

U.S. PATENT DOCUMENTS

| 5,450,335 A | 9/1995 | Kikuchi |
| 7,248,998 B2 * | 7/2007 | De Martini ...... G05B 19/41875 702/182 |

(Continued)

FOREIGN PATENT DOCUMENTS

| CN | 102498430 A | 6/2012 |
| CN | 104756114 A | 7/2015 |

(Continued)

OTHER PUBLICATIONS

Office Action for Chinese Patent Application No. 201780040440.1 dated Aug. 28, 2019 with English translation provided.

(Continued)

*Primary Examiner* — Balram T Parbadia
*Assistant Examiner* — Rahman Abdur
(74) *Attorney, Agent, or Firm* — NIXON & VANDERHYE

(57) ABSTRACT

Disclosed is a method for detecting a probable error in a set of data relative to a wearer and/or to a frame chosen by the wearer, at least one of these data being used for ordering an ophthalmic lens to be fitted into the frame for the wearer, the set of data including at least a value of a first parameter and a value of a second parameter different from the first parameter, the first and second parameters being relative to the wearer and/or a frame chosen by the wearer, the method including: a) determining a level of consistency of the values of the first and second parameter with each other, based on a predetermined statistical consistency rule linking the first and second parameters; and b) emitting, based on this level (Continued)

Figure 1:
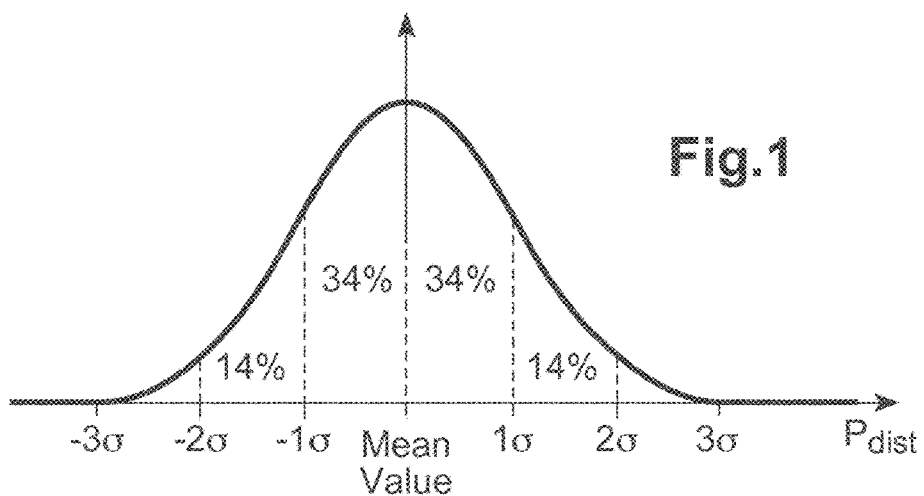

of consistency, an alert signal in order to report a probable error.

18 Claims, 5 Drawing Sheets

(58) Field of Classification Search
USPC .......................................................... 702/19
See application file for complete search history.

(56) References Cited

U.S. PATENT DOCUMENTS

| | | | |
|---|---|---|---|
| 9,703,122 B2 | 7/2017 | Haddadi et al. | |
| 9,974,435 B2 | 5/2018 | Haddadi et al. | |
| 2001/0051953 A1 | 12/2001 | Fukuma et al. | |
| 2006/0031024 A1* | 2/2006 | Mountassir | G06Q 10/04 |
| | | | 702/19 |
| 2008/0082181 A1* | 4/2008 | Miller | G05B 23/024 |
| | | | 700/30 |
| 2008/0244370 A1* | 10/2008 | Lam | G11C 11/5621 |
| | | | 714/803 |
| 2013/0231941 A1 | 9/2013 | Pham et al. | |
| 2016/0110932 A1 | 4/2016 | Klein et al. | |
| 2016/0124249 A1 | 5/2016 | Haddadi et al. | |

FOREIGN PATENT DOCUMENTS

| | | |
|---|---|---|
| EP | 0 583 915 A2 | 2/1994 |
| FR | 3013131 A1 | 5/2015 |
| WO | 2012/022380 A1 | 2/2012 |
| WO | 2014/195623 A1 | 12/2014 |

OTHER PUBLICATIONS

International Search Report and Written Opinion, dated Sep. 26, 2017, from corresponding PCT application No. PCT/EP2017/066366.

* cited by examiner

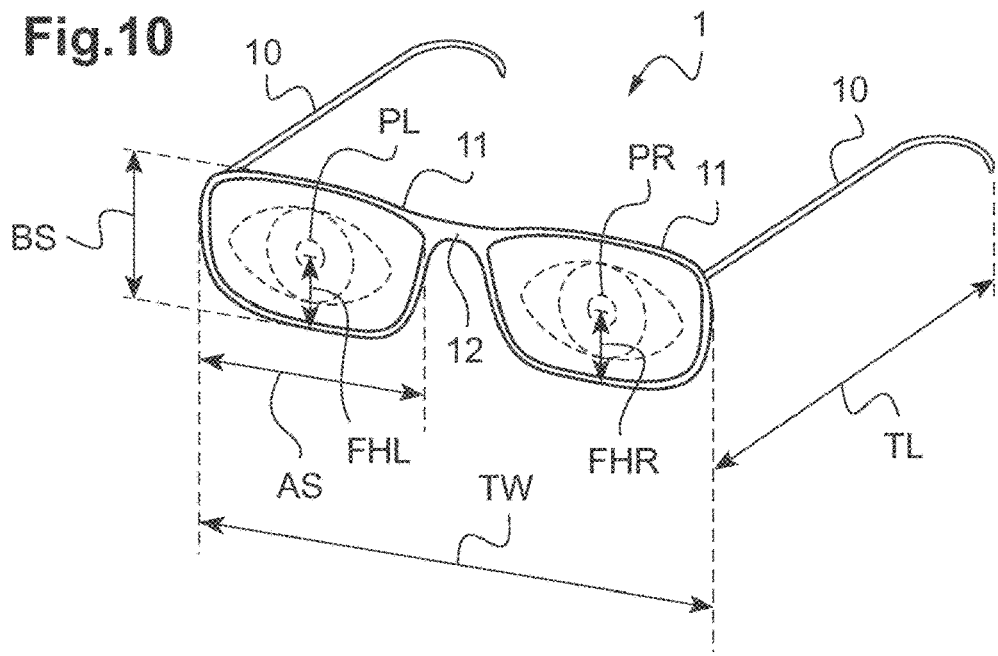
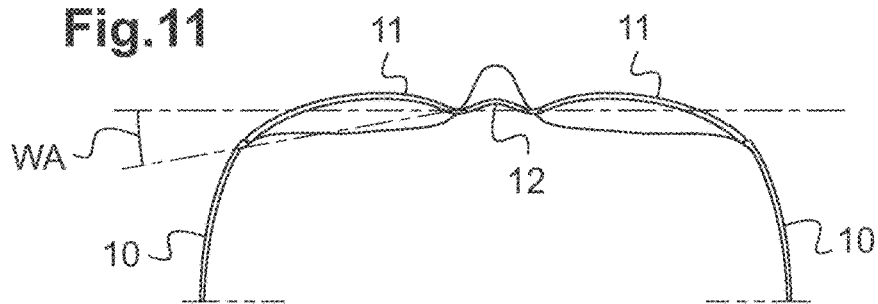
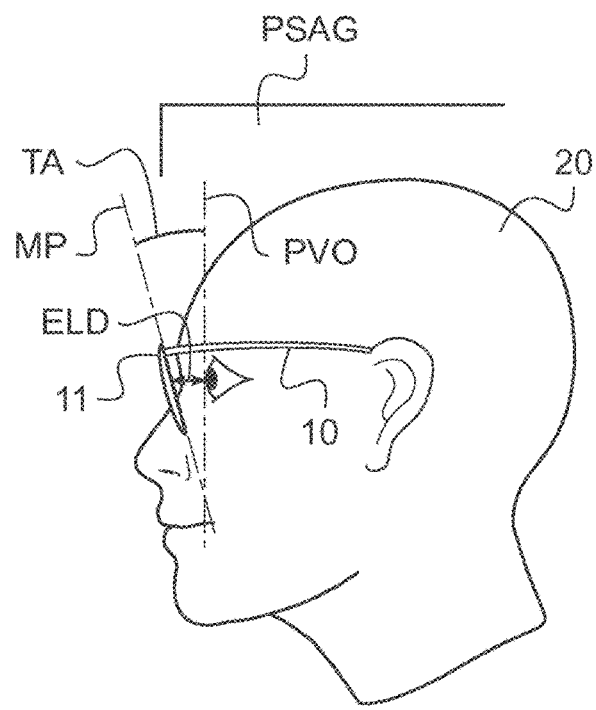

METHOD FOR DETECTING A PROBABLE ERROR IN A SET OF DATA RELATIVE TO A WEARER AND/OR A FRAME CHOSEN BY THE WEARER

TECHNICAL FIELD OF THE INVENTION

The invention relates to a method for detecting a probable error in a set of data relative to a wearer and/or to a frame chosen by the wearer.

BACKGROUND INFORMATION AND PRIOR ART

When ordering lenses to manufacture an optical equipment for a given wearer, the optician needs to fill an order form specifying many parameters needed for manufacturing the lenses.

This step may lead to input errors that may have important effects during the manufacturing of the lenses and/or mounting of the lenses on the frame and/or fitting of the eyeglasses on the wearer.

As a result, input errors may lead to manufacture an optical equipment that is not adapted to the wearer or to an impossibility of manufacturing said equipment.

In order to reduce the effects of such a mistake, a known solution is to control the optical equipment once it is manufactured. An optician can for example control the power of the lens using a focimeter, or check that the fitting cross is, when the eyeglasses are worn by the wearer, correctly aligned with eye pupil of the wearer.

However, these solutions may only verify the consistency of the lenses optical features with the order form or with the real fitting of the frame and lenses on the wearer. They may not check the intrinsic consistency of the parameters before the equipment is manufactured.

So, if any error is detected at that stage, it is too late to adapt the ordering form. The only solution is to try to modify the equipment manufactured, which is not easy nor always possible, or to order another equipment, which will be costly and time-consuming.

SUMMARY OF THE INVENTION

Therefore one object of the invention is to provide a method for detecting probable errors in an order form, allowing reducing the mistake/error rate related to wearer parameters input, thereby reducing the rate of ill-adapted equipment manufactured.

The above objects are achieved according to the invention by providing a method for detecting a probable error in a set of data relative to a wearer and/or to a frame chosen by the wearer, at least one of these data being used for ordering an ophthalmic lens to be fitted into said frame for said wearer, said set of data comprising at least a value of a first parameter and a value of a second parameter different from said first parameter, said first and second parameters being relative to the wearer and/or a frame chosen by the wearer, said method comprising the following steps:

a) determining a level of consistency of said values of the first and second parameter with each other, based on a predetermined statistical consistency rule linking said first and second parameters, b) emitting, based on this level of consistency, an alert signal in order to report a probable error.

Thanks to the method according to the invention, errors in the set of data used for ordering the lenses may be detected.

The operator is alerted and may verify the input of the parameters in order to correct the error before ordering the lenses.

Other advantageous and non limitative features of the method according to the invention are as follow:

- in step b), said signal is emitted when said level of consistency is below a predetermined minimal level;
- in step b), a first signal is emitted when said level of consistency is below a first predetermined minimal level and at least a second signal is emitted when said level of consistency is below a second predetermined level, different from the first predetermined minimal level;
- in step a), a probability for each parameter of having the corresponding value is determined, and the parameter whose value has the lowest probability is identified as the parameter exhibiting said probable error;
- at least one of said first and second parameters is relative to the wearer;
- at least one of said first and second parameters is chosen among the following parameters:
  - a parameter relative to the refraction features of at least one of the eyes of the wearer,
  - a fitting parameter relative to the position of the chosen frame and/or of the ophthalmic lens relative to the eyes of the wearer,
  - a morphologic parameter relative to the size and/or position of the features of the face of the wearer,
  - a visual behavior and/or postural parameter relative to the behavior of the wearer during a visual task;
- at least one of said first and second parameters is relative to the frame chosen by the wearer;
- at least one of said first and second parameters is a geometric parameter relative to a dimension of the frame;
- in step a), said predetermined statistical consistency rule takes into account a distribution function of said values of said first and/or second parameters or a distribution of a factor depending on the values of said first and/or second parameters;
- said statistical consistency rule takes into account a confidence interval determined based on said distribution function;
- in step a), said predetermined statistical consistency rule is determined based on a statistical multivariate frequency distribution function between said first and second parameters;
- said statistical multivariate frequency distribution function between said first and second parameters is obtained by collecting past values of said first and second parameters in each order received by an ophthalmic lens manufacturer during a predetermined period of time;
- said multivariate frequency distribution comprises numbers of orders received during said period of time having given values of said first and second parameters;
- said statistical consistency rule takes into account a distribution of the numbers of orders as a function of the values of said first and/or second parameters or as a function of a factor depending on said first and/or second parameter;
- said statistical consistency rule takes into account a confidence interval determined based on said multivariate frequency distribution function between said first and second parameters;
- said confidence interval is determined by a quantile analysis of said multivariate frequency distribution;

in step a), a theoretical value of the first parameter is determined based on said value of the second parameter and said predetermined statistical consistency rule comprises a comparison between said theoretical value and said value of the first parameter;

said predetermined statistical consistency rule comprises deducing a difference between said theoretical value and said value of the first parameter from said comparison, and comparing it to a difference threshold value;

said comparison between said theoretical value and said value of the first parameter is made thanks to a graphical display of the theoretical value and the value of the first parameter;

said statistical consistency rule comprises comparing the value of the first parameter to a target interval of values determined based on said value of the second parameter;

in step a), said predetermined statistical consistency rule takes into account a probability of having said value of the first parameter knowing a factor depending on the value of the second parameter, and/or a probability of having said value of the second parameter knowing a factor depending on the value of the first parameter;

the value of at least one of said first and second parameter is determined based on an image capture of the face of the wearer;

the value of at least one of said first and second parameter is determined by a direct measurement on the face of the wearer and/or on the frame;

the value of at least one of said first and second parameter is determined by retrieving data from a predetermined database.

The invention also relates to a method for ordering lenses, comprising the following steps:
determining a set of data for ordering said lenses,
inputting said set of data into a computer,
implementing the method for detecting a probable error according to any one of the previous claims,
in case an alert signal is emitted when implementing said method for detection a probable error, checking said set of data.

DETAILED DESCRIPTION OF EXAMPLE(S)

The method according to the invention will be described next, in reference with the appended drawings.

Figure 2:
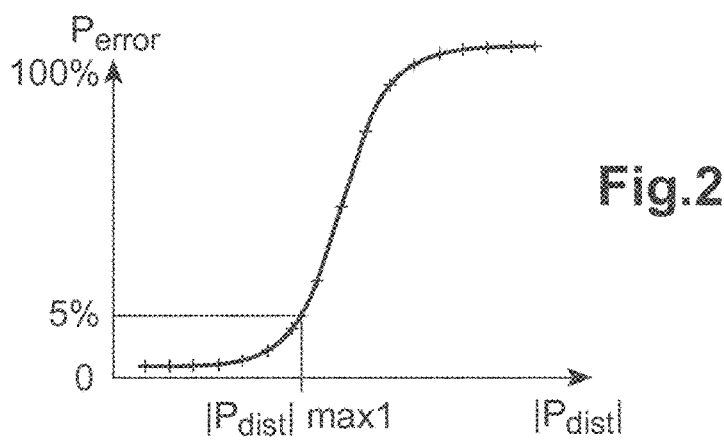
Figure 3:
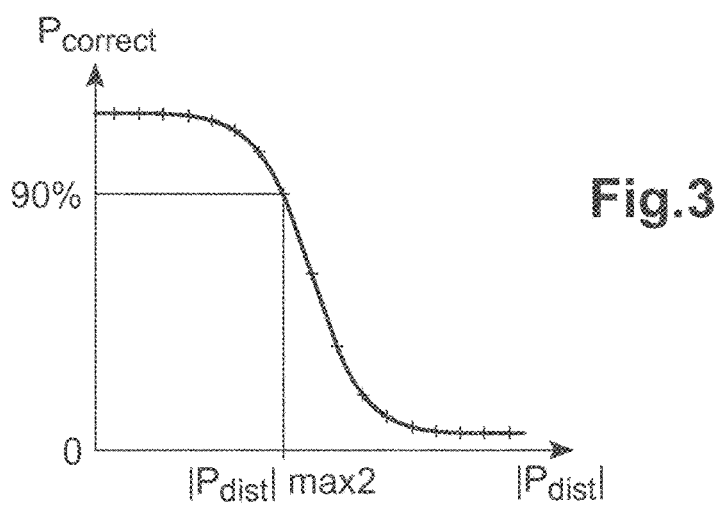
Figure 4:
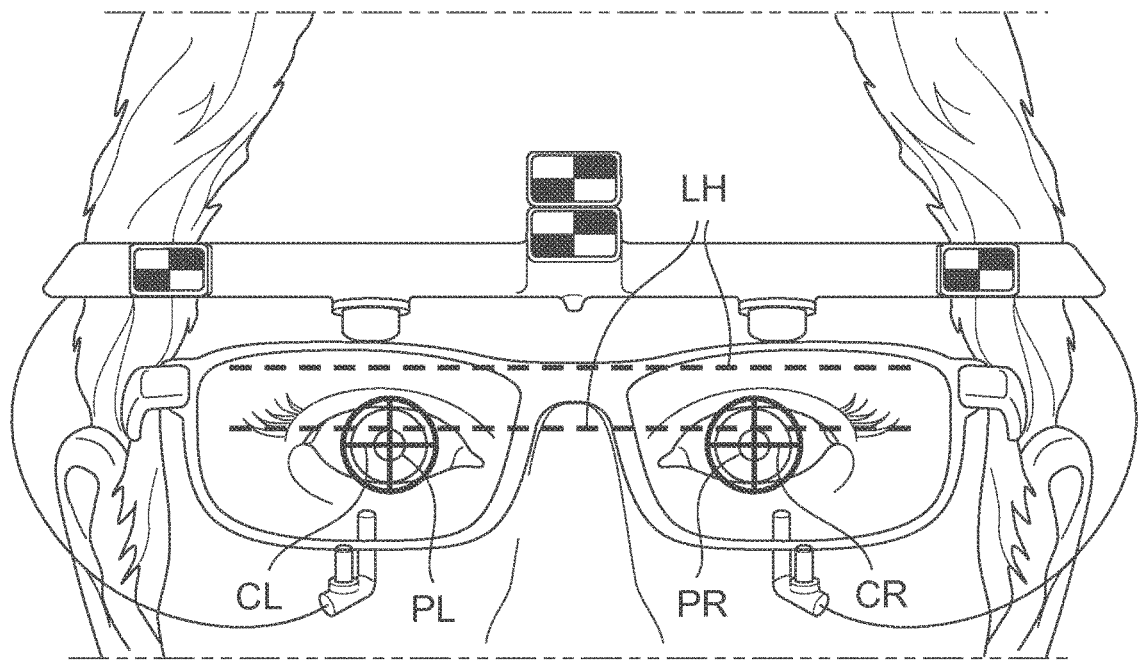
Figure 5:
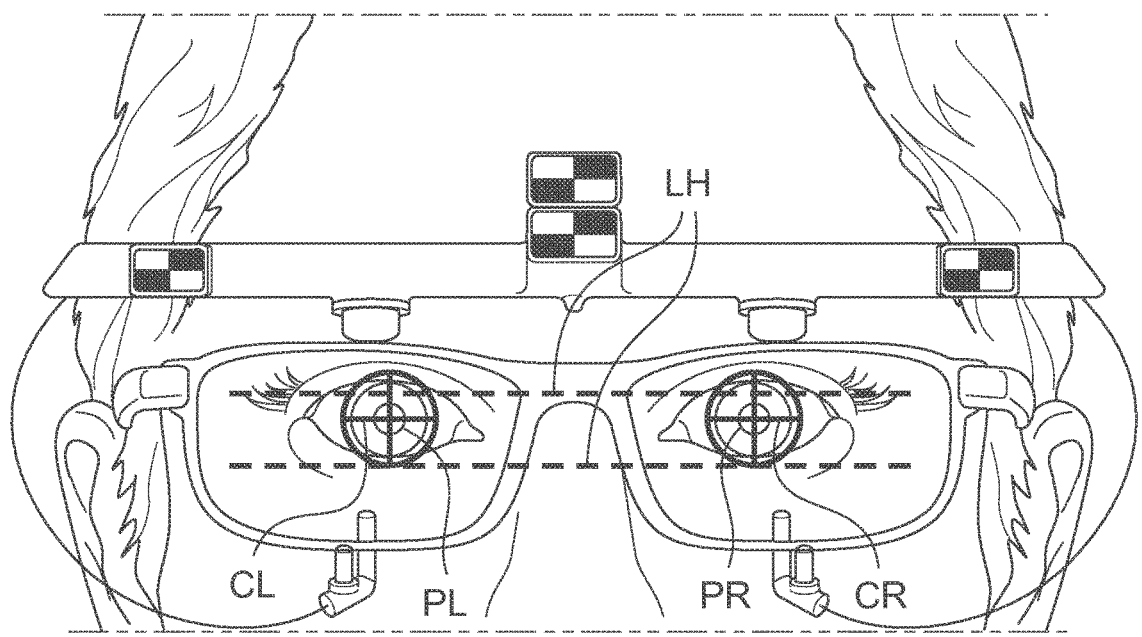
Figure 6:
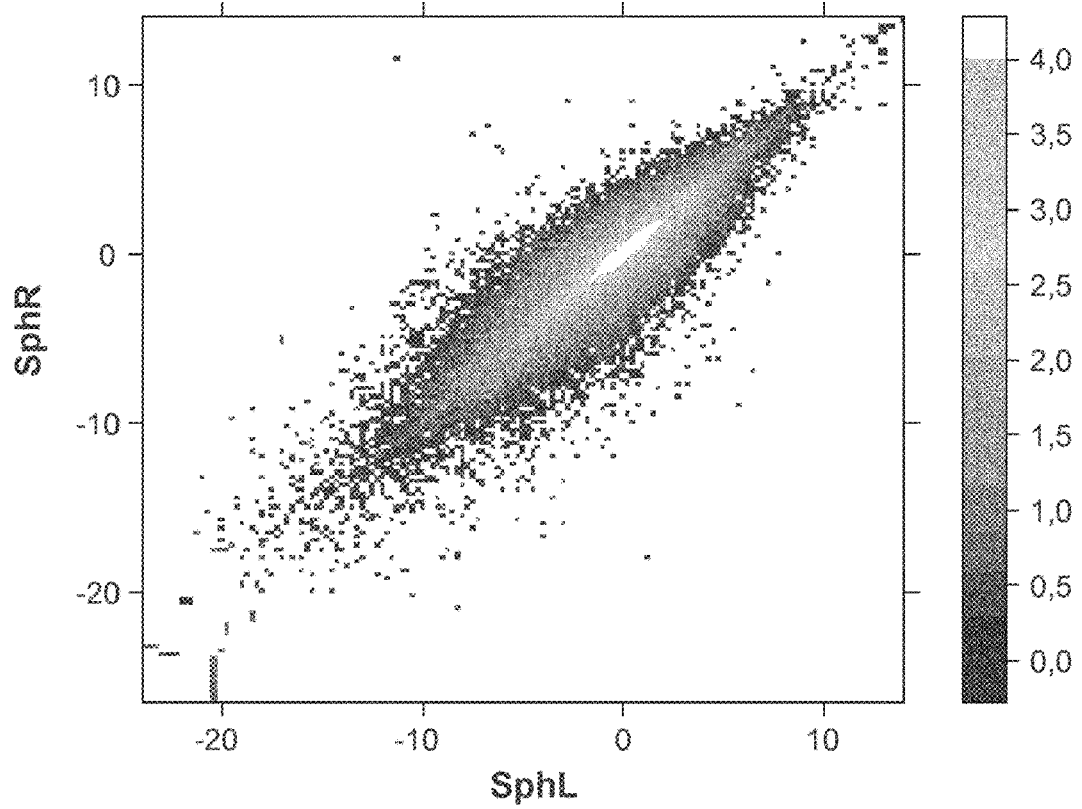
Figure 7:
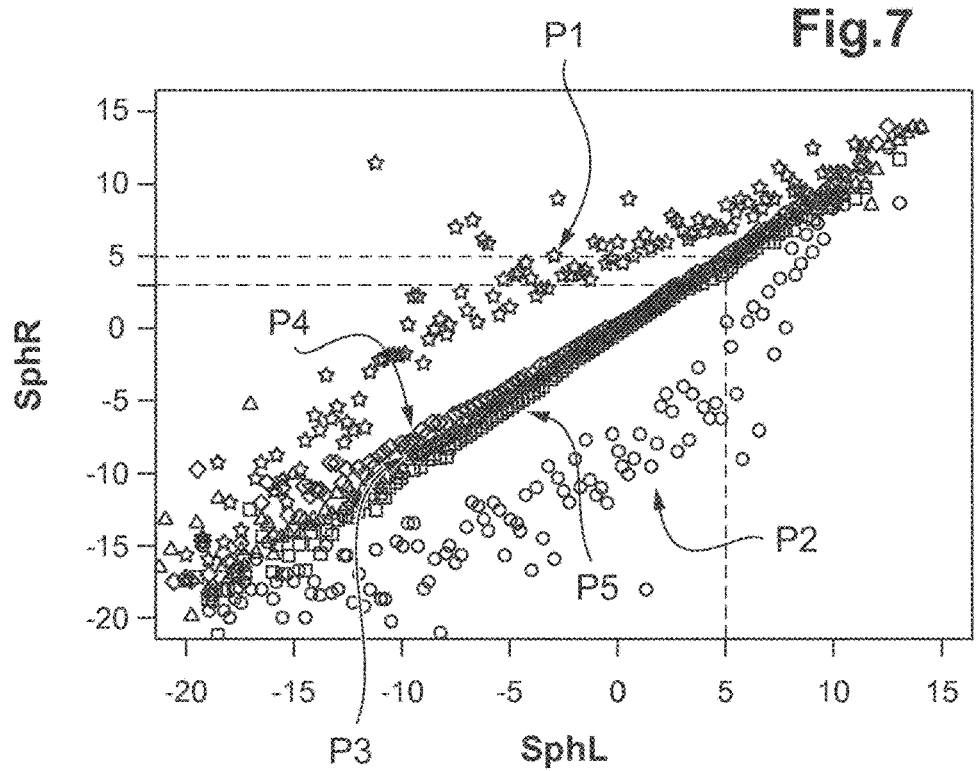
Figure 8:
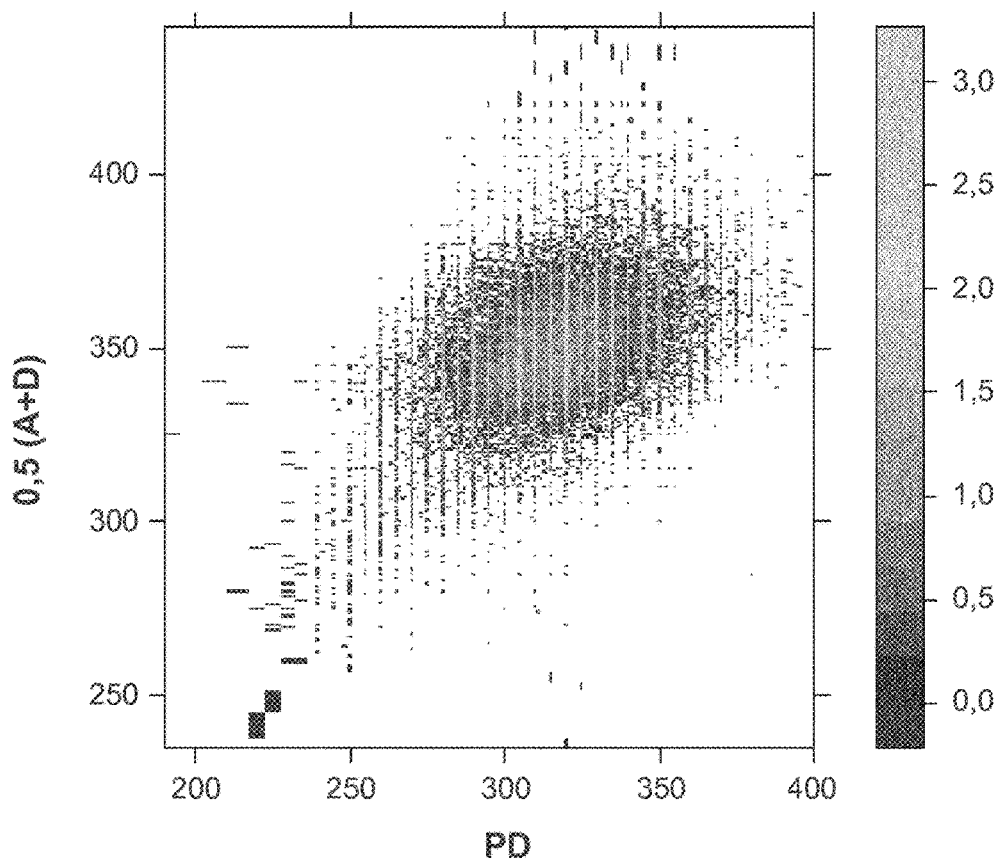
Figure 9:
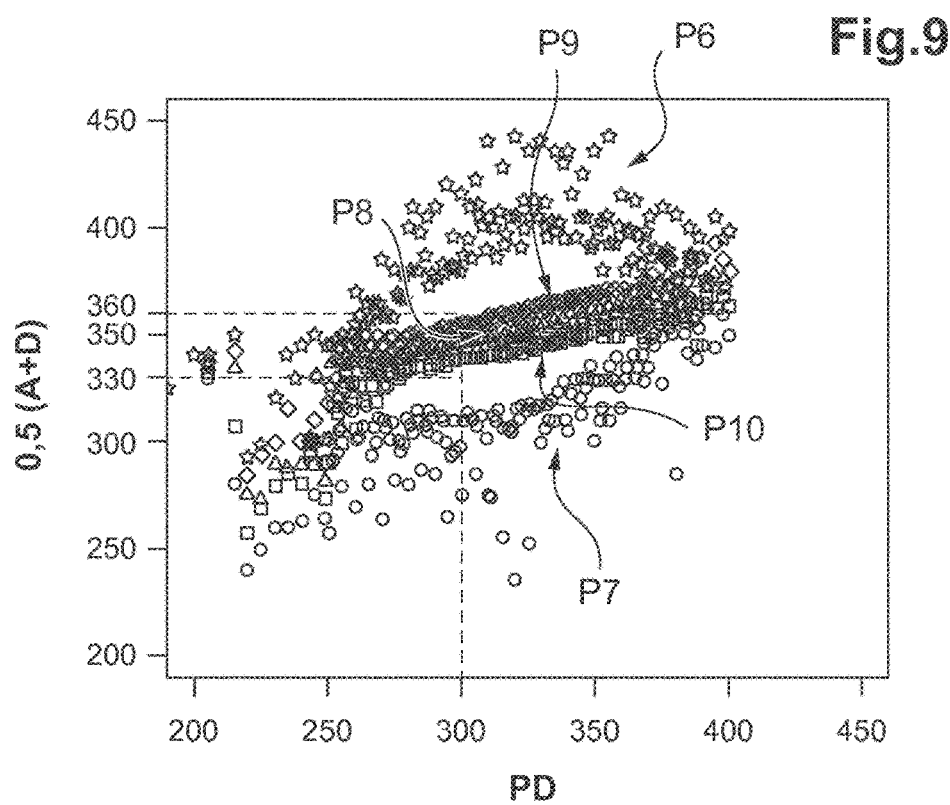

On the appended drawings:

FIG. 1 is an example of a distribution function of a factor depending on the first and second parameters, taken into account in the statistical consistency rule;

FIGS. 2 and 3 gives examples of probability functions of having an error (FIG. 2) or a correct parameter (FIG. 3), as a function of a factor depending on the first and second parameters;

FIGS. 4 and 5 give graphical displays of a theoretical domain of values and an actual value of the first parameter as compared in a step of the method according to the invention;

FIG. 6 gives a graphical representation of a multivariate frequency distribution with two parameters, that is to say a bivariate frequency distribution p(SphR, SphL), of the spherical refraction of right and left lenses ordered by a large population of wearer; the grey palette gives the logarithm in base 10 of this quantity, FIG. 7 gives a graphical representation of a quantile analysis of the multivariate frequency distribution corresponding to FIG. 6, as explained later on, FIG. 8 gives a graphical presentation of a bivariate frequency distribution q(PD, AD) of the pupillary distance of the wearer and the half-sum of A and D dimensions of the frame, corresponding to a large number of orders; the grey palette gives the logarithm in base 10 of this quantity, FIG. 9 gives a graphical representation of a quantile analysis of the multivariate frequency distribution corresponding to FIG. 8, as explained later on, FIGS. 10 to 12 illustrate the definitions of a few parameters relative to the frame chosen by the wearer or to the frame and the head of the wearer.

The method according to the invention allows detecting errors in a set of data input by an operator into a computer for ordering ophthalmic lenses to be fitted in a frame 1 chosen by the wearer in order to manufacture an optical equipment adapted to the wearer.

An example of circled frame 1 is shown on FIG. 10. It comprises here two circles 11 linked by a bridge 12. A temple 10 is articulated on each of the circle 11.

In semi circled or uncircled frames, the circles may be partially or totally omitted. The bridge and temples may then be connected directly to the lenses.

The invention relates to a method for ordering said lenses, comprising the following steps:
determining said set of data for ordering said lenses,
inputting said set of data into a computer for ordering said lenses,
implementing a method for detecting a probable error in said set of data,
in case an alert signal is emitted when implementing said method for detecting a probable error, checking said set of data for said error.

Said set of data is relative to a wearer and/or to a frame chosen by the wearer and at least one of these data is used for ordering the ophthalmic lens to be fitted into said frame for said wearer.

Said set of data comprises at least a value of a first parameter and a value of a second parameter different from said first parameter, said first and second parameters being relative to the wearer and/or a frame chosen by the wearer.

The error detection method according to the invention comprises the following steps:
a) determining a level of consistency of said values of the first and second parameter with each other, based on a predetermined statistical consistency rule linking said first and second parameters,
b) emitting, based on this level of consistency, an alert signal in order to report a probable error.

Thanks to the error detection method according to the invention, errors in the set of data used for ordering the lenses may be detected. The operator is alerted and may verify the input or the determination of the values of said first and second parameters in order to correct the error before ordering the lenses.

This avoids manufacturing lenses in inadequate features, that is to say not correctly adapted to the wearer and/or to the chosen frame. It avoids having to manufacture the lenses a second time, therefore saving time and money.

The parameters relative to the wearer and/or to the frame may be determined by any know mean, for example, by direct measurements on the face of the wearer and/or on the frame chosen, by treatment of one or several pictures of the face of the wearer, with or without said chosen frame, by calculation based on a model of the face of the wearer. The value of the first and second parameters may also be retrieved from a predetermined database. In particular, this database may comprise the values of said parameters relative to the wearer that have been determined previously.

The database may also comprise for example, the geometric features of the frame as indicated by the manufacturer of said frame.

In particular, at least one of said first and second parameters is relative to the wearer.

This parameter relative to the wearer may for example be relative to the refraction features of at least one of the eyes of the wearer, in particular: sphere power, cylinder power, prismatic power, axis, addition. It may also be relative to geometric features of the eye, such as eye radius or pupil diameter.

The sphere power indicates the amount of lens power, measured in diopters (D), prescribed to correct nearsightedness or farsightedness.

The cylinder power indicates the amount of lens power for correcting astigmatism.

The axis describes the lens meridian that contains no cylinder power to correct astigmatism.

Addition is the added magnifying power applied to the bottom part of multifocal lenses to correct presbyopia.

The prism is the amount of prismatic power, measured in prism diopters, prescribed to compensate for eye alignment problems.

The eye radius is the distance between the cornea and the eye rotation center.

Such a parameter may be determined based on the prescription of the wearer, by a visual test carried on by the optician, by direct measurement or determination based on an image capture of the wearer.

It may also be determined by measuring the optical features of the former lenses of the equipment of the wearer, using for example a focimeter.

This parameter relative to the wearer may also be a fitting parameter relative to the position of the chosen frame and/or of the ophthalmic lens relative to the eyes of the wearer, in particular: fitting height of right and/or left eye FHR, FHL, pantoscopic angle TA, eye-lens distance ELD, near/far vision position, inset length of progression. Some of these parameters are shown on FIGS. 10 to 12.

The fitting parameters may be determined using a specific device, for example the Visioffice tool of the applicant, or may be determined manually, using of example a ruler.

The fitting height FHR, FHL is defined here as the vertical distance between the pupil PR, PL of the wearer and the bottom edge of the lens or of the frame, when the eyeglasses are worn by the wearer.

The pantoscopic angle TA, also called tilt angle (FIG. 12), is measured in a sagittal plane PSAG of the head 20 of the wearer, between the mean plane MP of each circle of the frame or the mean plane of each lens and a vertical facial plane PVO of the wearer, perpendicular to a primary line of sight. The primary line of sight is the line of sight achieved when the wearer looks straight in front of him.

The Frankfurt plane of the head of the wearer is defined as the plane passing through the inferior margin of the left orbit (the point called the left orbital) and the upper margin of each ear canal or external auditory meatus, a point called the portion. It is also called the auriculo-orbital plane.

The sagittal plane of the head of the wearer is a vertical plane comprising the perpendicular bisector of the two eyes, the perpendicular bisector of the eye being defined as the line going through the middle of the segment between the center of rotation of the eyes and parallel to the Frankfurt plane.

The parameter relative to the wearer may also be a morphologic parameter relative to the size and/or position of the features of the face of the wearer, such as inter-pupillary distance, half inter-pupillary distance, eye rotation center position.

The parameter relative to the wearer may also be a visual behavior and/or postural parameter relative to the behavior and/or the posture of the wearer during a visual task, in particular: head posture, reading distance, distance between head and display device, lowering angle from near to far vision. In the case of progressive lenses, it may also be the position of the near and/or far vision on the lens or the position of 85% addition power on the lens.

The head posture is defined by the position and orientation of the head in a predetermined referential.

The lowering angle from near to far vision is the angle between the line of sight during a near vision task and the line of sight during a far vision task.

These parameters may be determined with behavioral tests. They may also be taken as equal to mean values determined statistically over a population of wearer.

Moreover, at least one of said first and second parameters may be relative to the frame chosen by the wearer.

In particular, it may be a geometric parameter relative to a dimension of the frame, in particular: B size BS, A size AS, D size, L size, base of frame BF, wrap angle WA (FIG. 11), temple width TW and length TL (FIG. 10).

These dimensions are defined in the norm ISO8624.

In particular, A and B sizes correspond to the dimensions of a rectangle in which the circle of the frame is fitted. D size is the bridge length, L size is the length of the temples TL and the base of the frame is the horizontal frame curvature.

More precisely, the base of the frame is the curvature of the best sphere "best-crossing" the points of the internal edge of the frame multiplied by 0.531 (this last number represent the index of standard optical material−1).

The wrap angle is the angle between the mean plane of each circle of the frame or lens and the vertical facial plane, measured in the plane perpendicular to the sagittal plane and vertical facial plane (wrap angle, FIG. 11).

The temple width is the distance between the temples and the temple length corresponds to an overall length of the temples.

These parameters can be determined from automatic measurements (frame tracer for example, Essilor Tess), or from manual measurements using a ruler, from reading indication written on the frame, or from data retrieved from a frame database.

The parameters relative to the wearer may in particular be determined using an image captured, for example with a tablet.

The tablet is held by the wearer while reading. An image capture apparatus, for example integrated to the tablet, captures an image of the wearer.

The wearer wears the frame he selected, and also a reference device to scale the image. Such reference devices are well known and will not be described in details here. This reference device is for example clipped on the top edge of the frame and presents a know geometry, adequate for scaling the image captured.

The first and second parameters described may lead to error either during their determination, for example in the measurement, in reading a database or a prescription, or at the input of these parameters in the ordering system.

In particular, the fitting parameters may lead to errors for many reasons:
- the wearer may have in incorrect posture, leading for example to incorrect measurement of the fitting height or of the interpupillary distance.
- the wearer may have difficulty to understand the process of measurement, leading to incorrect parameter for all parameters,
- the optician may make some mistake during the measurement.

In a first embodiment of the method according to the invention, in step a) said predetermined statistical consistency rule takes into account a probability or a distribution function of having said value of the first parameter knowing the value of the second parameter, and/or a probability or a distribution function of having said value of the second parameter knowing the value of the first parameter.

In a first example illustrating this first embodiment, the first parameters comprise the fitting height of the wearer. Its value is determined by any known method, for example by a direct measurement by the optician. In this example, the optician has determined the fitting height of each eye of the wearer, by a direct measurement with a ruler.

The first parameters also comprise the B size of the frame chosen by the wearer, whose value is for example determined by retrieving it from a database, and the sphere and cylinder power of the lens required for the wearer, determined for example from a prescription.

The tablet described previously is used to capture an image of the wearer when looking straight away, so in posture close to the posture used for previous fitting height measurement.

The second parameter is here the position of the image of the pupil of the eye in the image captured.

The values of the first and second parameters are input in the tablet by the optician.

A computer unit, here integrated in the tablet, is then programmed for determining said level of consistency of said values of the first and second parameters with each other.

In order to do that, a theoretical value of the second parameter is determined based on said input values of the first parameters and said predetermined statistical consistency rule comprises a comparison between said theoretical value and said input value of the second parameter.

More precisely, the computer unit is programmed to determine a theoretical value of the position of the image of the pupil in the photo when the wearer has a posture and a gaze direction similar to the conditions in which the fitting heights of the eyes are determined, that is to say when the wearer looks straight ahead.

This theoretical value of the second parameter is determined based on the input value of the fitting height that has been input by the optician.

In practice, the computer unit is programmed to identify, in the captured image, the image of the frame and/or the image of the reference device placed on the frame. This is achieved by state of the art image processing.

The position of the top edge PosFrame of the frame on the captured image is thus determined in a referential linked to the image. This position is for example given by the distance between the top edge of the frame and the bottom edge of the image.

The referential in which these positions are determined comprise an axis parallel to the side edge of the image, oriented from the top edge to the bottom edge of the image, that is to say from the image of the top of the head of the wearer to the image of his chin.

The theoretical value TP of the position of the image of the pupil is then calculated as the position PosFrame of the image of the top edge of the frame, plus the B size BS of the frame, minus the value of the fitting height FH input by the optician: TP=PosFrame+BS−FH.

Then this theoretical position TP is compared to the input value of the position of the pupil in the image captured.

This input value of the position of the image of the pupil was determined by conventional image processing technique.

The difference Pdist between the theoretical position TP and the input position AP of the image of the pupil is determined: Pdist=TP−AP.

The statistical consistency rule then determines the level of consistency of the input values of first and second parameters based on this difference Pdist.

This statistical consistency rule takes into account a distribution function of said values of said first and/or second parameters or a distribution of a factor depending on the values of said first and second parameter.

Here, it takes into account a distribution function of the difference Pdist, which is a factor depending on the first and second parameters.

More precisely, the statistical consistency rule takes here into account a range of uncertainty Delta corresponding to an interval of confidence determined based on the distribution function of the difference Pdist.

If the difference Pdist is within this interval of confidence, the level of consistency determined for the input value of the fitting height is higher than when the difference Pdist is not in this interval.

For example, based on the distribution of the numbers of orders as a function of the values of said first and second parameters, a statistical distribution of the difference Pdist between theoretical and input values of the position of the image of the pupil may be determined. It may for example have a form of a Gaussian distribution centered on a mean value of Pdist, here equal to 0. The shape of this distribution function is shown on FIG. 1. On this figure, the percentages give the probability of having Pdist in the corresponding interval.

The interval of confidence may then be determined as the interval of values within $2\sigma$ of the mean value of the Gaussian distribution, $\sigma$ being the standard deviation of the statistical distribution. The interval of confidence between $-2\sigma$ and $+2\sigma$ then covers 95% of the differences Pdist.

The level of consistency may be binary.

A level of consistency equal to 1 may here be associated with the input values of first and second parameters when the difference Pdist is within the interval of confidence, whereas the level of consistency is 0 when the difference Pdist is out of the interval of confidence. The computer unit is programmed to establish these associations and store them in a memory.

Moreover, in step b), said signal is emitted when said level of consistency is below a predetermined minimal level.

For example, emission of an alert signal by an alert device is triggered by the computer unit if the level of consistency is determined as 0.

This alert signal may be visual or a sound. A red sign may for example be displayed on the tablet when the consistency level of the first and second parameters with each other is 0.

In a variant of step a), said comparison between said theoretical value and said input value of the position of the image of the pupil is made thanks to a graphical display of the theoretical value and the input value of the position of the image of the pupil.

The theoretical value is represented here by a range of target value determined as a function of this theoretical value.

More precisely, the range of target values for the input value of the position of the image of the pupil is determined based on the theoretical value and the confidence interval. For example, it may be determined by adding or subtracting an uncertainty factor determined as a function of the standard deviation of the distribution of the difference Pdist to the theoretical value of the position of the image of the pupil.

This range of target value framing the theoretical value of the position of the image of the pupil is then displayed on the image as the area between two corresponding horizontal lines. The range of target value is another type of interval of confidence.

When the input value is within the target range, the level of confidence is higher than when the input value is outside the target range.

This is shown in FIGS. 4 and 5, where the two horizontal lines LH displayed on the captured image corresponds to the target range, and the cross CL, CR marks the input position of the pupil PL, PR of the wearer.

On FIG. 4, the crosses CL, CR are out of the interval of confidence marked by the horizontal lines LH. The level of confidence is low, here equal to 0. The alert signal is emitted for the optician to check the input values of the set of data.

In the example described here, as the interval of confidence is displayed graphically through the target range, displaying the crosses out of the target range is in itself an alert signal. Step a) and b) are then achieved simultaneously.

On FIG. 5, the crosses CL, CR are inside the interval of confidence marked by the horizontal lines LH. The level of confidence is high, here equal to 1.

As a variant, a plurality of level of consistency may be defined.

For example, here, a high level of consistency may be defined when the input value of the second parameter falls inside the target range within σ of the theoretical value, a medium level of consistency may be defined when the input value falls within 2σ of the theoretical value and a low level of consistency may be defined corresponding to the values of the second parameter outside the target range that is 4σ wide.

In this variant, a first alert signal may be emitted when said level of consistency is below a first predetermined minimal level, for example, below the low level of consistency and at least a second alert signal may be emitted when said level of consistency is below a second predetermined level, for example below the medium level of consistency. Preferably, the second alert signal is emitted when said level of consistency is above said first predetermined minimal level and below said second predetermined level.

For example, the high level of consistency may be associated with the index 2 and the green color, whereas the medium level of consistency may be associated with the index 1 and the orange color, and the low level of consistency may be associated with the index 0 and the red color. The alert signal is here a visual signal associated to the color displayed.

The level of consistency may also be quantified on a continuous scale, giving higher number while consistency increases.

For example, the level of consistency could be determined based on the relative position of the cross and the horizontal lines in the example above. The consistency level is higher when the cross is closer to the region comprised between the horizontal lines.

In another variant of the example detailed above, a probability of error Perror as a function of the difference Pdist may be determined.

The error can be defined for example as occurring when a minimum deviation between theoretical value and input value of parameter is observed, for example causing a difference of +/−1 mm on the fitting height value.

This probability function may be determined base on a database built from real cases measurements, storing the values of the difference Pdist and the corresponding presence of an error on the B size of the frame and/or on the fitting height parameter of the wearer in these real cases.

The presence of an error may be determined when building this database from comparison between the input values (BS,FH) and the exact values (BSe,FHe) that are determined from highly accurate measurement devices.

When the difference between input and exact values is above a predetermined deviation threshold, the presence of an error is stored in the database in association with the corresponding value of the difference Pdist.

This predetermined threshold may be for example set as a percentage of the exact value: if the difference between input and exact values is over 10 to 20% of the exact value, the presence of an error is detected.

From this database, it is then possible to determine a curve giving for each value of the difference Pdist the probability of having an error in the set of data considered.

The statistical consistency rule comprises then comparing said difference to a difference threshold value.

A threshold value for the difference Pdist may be determined based on this probability of error function, for example by determining the maximal absolute value of the difference |Pdist|max1 for which the probability of error remains below 5%.

FIG. 2 shows an example of the curve of a function giving the probability of having an error on the input value of the fitting height according to an absolute value of the difference |Pdist|.

The threshold value is selected so that poor consistency is showed when the probability of error is over 5%.

In the opposite, a probability of having the correct value Pcorrect for the first parameter as a function of the absolute value of the distance |Pdist| may be determined. The determination of this probability curve may be achieved base on the probability of having an error, with the following formula: Pcorrect=1−Perror or 100%−Perror.

Then, the low level of consistency is determined when the probability of having the correct value of the first parameter falling under another threshold value, for instance 90%. Another difference threshold value |Pdist|max2 is determined accordingly. The level of consistency is determined as a function of the comparison between the factor |Pdist| determined and the threshold value |Pdist|max2. It is lower when the factor is superior to the threshold value.

This is shown on FIG. 3.

The statistical consistency rule then comprises a comparison between a factor relative to the first and second parameter, here relative to the difference between the theoretical and input value: the absolute value of the difference |Pdist|, and a threshold value of this factor |Pdist|max1, |Pdist|max2, determined statistically, here depending on a probability function of false or correct value of this factor.

If the level of consistency is low, that is to say inferior to said predetermined threshold value or equal to 0 in the previous example, this does not mean that the value of the parameter considered is false with certainty. It may mean that the value is not common, relative to the corresponding other parameters values. Reciprocally, a high level of consistency, that is to say a level higher than a predetermined threshold, only means that the value of the parameter considered is usual as regards to the values of the other parameters.

It does not necessarily mean that the parameter considered has a correct value.

Advantageously, in step b), a probability for each parameter of having the input value is determined, and the parameter whose input value has the lower probability is identified as the parameter exhibiting said probable error.

In particular, when a low consistency level is determined, the probability of occurrence of each value of the first and second parameters by themselves is determined.

The parameter for which probability is the lowest is identified as the parameter to be checked in priority. This may guide the optician and allow him to find the error, if any, quickly.

The optician may then check this parameter by measuring it again or by checking the input of the measured value.

As an example, the input value of fitting height is usually measured between 0 millimeter (mm) and 30 mm with a step of 0.5 mm.

The real B size of the frame is 25 mm.

The input fitting height is 13 mm, and the input B size is 35 mm.

The input of the B size is then wrong, as it is different from the real B size of 35 mm.

The position of the image of the pupil in the image captured is 11 mm from the upper edge of the frame, while the theoretical position of the pupil is calculated to be 35−13=22 mm from upper edge because of B size error, instead of 25−13=12 mm in case of no B size error.

The standard deviation on the difference between theoretical and input value is for example 1.25 mm. The difference between the theoretical value and the input value is here 10 mm, much higher than 2*1.25=2.5 mm.

The difference therefore does not fall into the interval of confidence at $2\sigma$.

The level of consistency determined is therefore low, for example equal to 0.

From fitting height statistic distribution, the computer unit determines that the probability of having the fitting height equal to 13 mm is 0.005, or 0.5%.

From B size statistic distribution, the computer unit determines that the probability of having the B size equal to 35 mm is 0.001 or 0.1%.

The computer unit is programmed to compare the probability of each parameter to have the input value, and determines that the error most likely comes from the input value of the parameter whose probability is the lowest. This information is given to the optician.

In the previous example, the probability of having a B size of the frame equal to 35 mm is inferior to the probability of having the fitting height equals to 13 mm. This means that the error probably comes from B size value.

In an additional step, the computer unit indicates that the error probably comes from the B size value. So, the optician will check if B has a correct value and may eventually redo the measurement of the B size of the frame.

In another embodiment, in step a), said predetermined statistical consistency rule is determined based on a statistical multivariate frequency distribution between said first and second parameter, obtained by collecting past values of said first and second parameters in each order received by an ophthalmic lens manufacturer during a predetermined period of time.

The multivariate frequency distribution is also called occurrence distribution. It may be presented as a contingency table or as a graphical multidimensional distribution.

For a couple (X, Y) of parameters having the values x, y, we will note the multivariate distribution function p(X=x, Y=y) or q(X=x, Y=y) that measures the number of observations where X=x and where Y=y in the bivariate case.

For a single variable X, the probability of having X=x will be noted P(X=x).

Said contingency table or multidimensional distribution comprises numbers of orders received during said period of time having given past values of said first and second parameters. An observation of the parameter X having the value x therefore corresponds to an order received where the parameter X has the value x.

Said statistical consistency rule then takes into account a distribution of the numbers of orders as a function of the values of said first and/or second parameters.

Such an embodiment is illustrated by two examples, corresponding respectively to FIGS. 6 and 7 and FIGS. 8 and 9.

FIGS. 6 and 8 show a graphical representation of a multivariate frequency distribution.

On FIG. 6, the grey color scale gives the logarithm in base 10 of the number of orders for a given couple of value of the spherical refraction of the left and right lens ordered, corresponding to the spherical refraction of the left and right eye of the wearer.

On FIG. 8, the grey color scale gives the logarithm in base 10 of the number of orders for a given couple of value of the pupillary distance of the wearer and right lens ordered and the half sum of the A and D dimensions of the frame.

In both cases, the grey color scale indicates higher numbers of orders having the parameters corresponding to the vertical and horizontal axis for lighter shades.

FIG. 6 gives the number of orders registered during 6 weeks in selected points of sale, for progressive lenses, as a function of the sphere power of the left lens SphL (abscissa) and of the right lens SphR (ordinate), in diopters.

FIG. 8 gives the number of orders registered during 6 weeks in selected point of sale, for progressive lenses, as a function of the pupillary distance of the wearer PD in millimeters (abscissa) and of the half sum AD of A size and D size of the frame chosen AD=0.5(A+D) in millimeters (ordinate).

A treatment of these data with a quantile analysis gives the graphs of FIGS. 7 and 9.

FIG. 7 gives a graphical representation of a quantile analysis of the distribution p(SphR,SphL=s) that is to say the distribution of the spherical refraction of the right lens knowing that the spherical refraction of the left lens is equal to the value s. The quantile analysis is therefore made for a univariate conditional distribution p(SphR,SphL=s) for each value s of the spherical refraction SphL of the left lens ordered.

Different sets of points are shown with different symbols.

The upper set of points P1, represented by the star-shaped symbols on FIG. 7, gives the value of the spherical refraction of the right lens SphR for which the distribution of the spherical refraction of the right lens, knowing that the spherical refraction of the left lens is equal to the value s, is maximum.

In other words, the upper set of points P1 gives the quantity M1(s)=Max(p(SphR,SphL=s)).

The lower set of points P2, represented by the circle-shaped symbols on FIG. 7, gives the value of the spherical refraction of the right lens SphR for which the distribution of the spherical refraction of the right lens, knowing that the spherical refraction of the left lens is equal to the value s, is minimum.

In other words, the lower set of points P2 gives the quantity $m1(s)=Min(p(SphR,SphL=s))$.

The central set of points P3, represented by the triangle-shaped symbols on FIG. 7, gives the median values $me1(s)$ of univariate conditional distribution $p(SphR,SphL=s)$.

The set of points P4 just above the central set of points P3, represented by the diamond-shaped symbols on FIG. 7, corresponds to the value of the spherical refraction of the right lens sr95 for which the following formula is verified:

$$\frac{\sum_{sr95(s)>SphR>me1(s)} p(SphR, SphL = s)}{\sum_{SphR>me1} p(SphR, SphL = s)} = 0.95.$$

The value sr95 then corresponds to a first threshold value of the spherical refraction of the right lens for which the probability of the spherical refraction of the right lens being below this first threshold is 95%, knowing that the spherical refraction of the left lens is equal to the value s.

The set of points P5 just below the central set of points P3, represented by the square-shaped symbols on FIG. 7, correspond to the value of spherical refraction of the right lens sr5 for which the following formula is verified:

$$\frac{\sum_{me1(s)>SphR>sr5(s)} p(SphR, SphL = s)}{\sum_{me1(s)>SphR} p(SphR, SphL = s)} = 1 - 0.05.$$

The value sr5 then corresponds to a second threshold value of the spherical refraction of the right lens for which the probability of the spherical refraction of the right lens being below this first threshold is 5%, knowing that the spherical refraction of the left lens is equal to the value s.

FIG. 9 gives a graphical representation of a quantile analysis of the distribution $q(PD,AD=u)$, that is to say the distribution of the pupillary distance PD knowing that the half sum of A and D dimensions of the frame is equal to the value u.

The quantile analysis is therefore made for a univariate distribution $q(PD,AD=u)$, for each value u of the half sum of A and D dimensions of the frame.

The upper set of points P6, represented by the star-shaped symbols on FIG. 9, gives the value of the pupillary distance for which the distribution of the pupillary distance, knowing that the half sum of A and D dimensions of the frame spherical refraction of the left lens is equal to the value u, is maximum.

In other words, the upper set of points P6 gives the quantity $M2(u)=Max(q(PD,AD=u))$.

The lower set of points P7, represented by the circle-shaped symbols on FIG. 9, gives the value of the pupillary distance for which the distribution of the pupillary distance, knowing that the half sum of A and D dimensions of the frame spherical refraction of the left lens is equal to the value u, is minimum.

In other words, the lower set of points P7 gives the quantity $m2(u)=Min(q(PD,AD=u))$.

The central set of points P8, represented by the triangle-shaped symbols on FIG. 9, are the median values $me2(u)$ of the univariate conditional distribution $q(PD,AD=u)$.

The set of point P9 just above the central set of point P8, represented by the diamond-shaped symbols on FIG. 9, corresponds to the value of the pupillary distance pd95 for which the following formula is verified:

$$\frac{\sum_{pd95(u)>PD>me2(u)} q(PD, AD = u)}{\sum_{PD>me2(u)} q(PD, AD = u)} = 0.95.$$

The value pd95 then corresponds to a first threshold value of the pupillary distance of the wearer for which the probability of the pupillary distance being below this first threshold is 95%, knowing that the half sum the A and D dimensions of the frame is equal to the value u.

The set of points P10 just below the central set of points P8, represented by the square-shaped symbols on FIG. 9, corresponds to the value of the pupillary distance pd5 for which the following formula is verified:

$$\frac{\sum_{me2(u)>PD>pd5(u)} q(PD, AD = u)}{\sum_{me2(u)>PD} q(PD, AD = u)} = 1 - 0.05.$$

The value pd5 then corresponds to a second threshold value of the pupillary distance of the wearer for which the probability of pupillary distance of the wearer being below this first threshold is 5%, knowing that the half sum the A and D dimensions of the frame is equal to the value u.

Based on these graphs, for any given input value of one of the two parameters linked by the graph, a theoretical value of the other parameter may be determined, for example as the median value, and a confidence interval may be determined as the difference between the first and second threshold values sr95 and sr5 or pd95 and pd5 as defined before.

A target range of values for the other parameter may be determined as the range of values comprised between the first and second threshold values as defined before.

For example, based on FIG. 7, if the order comprises an input value of the sphere power of the left lens equal to 5 diopters, the target range for the value of the sphere power of the right lens is comprised between 3 and 5 diopters.

Then, when the input value of the sphere power of the right lens is indeed comprised between 3 and 5 diopters, the level of consistency is high, for example set to 1. No alert signal is emitted.

When the input value of the sphere power of the right lens is not comprised between 3 and 5 diopters, the level of consistency is low, for example set to 0. The alert signal is then emitted.

Based on FIG. 9, if the order comprises an input value of the interpupillary distance equal to 300 tenth of millimeters (30 mm), the target range for the half sum of A size and D size of the frame is comprised between 330 and 360 tenth of millimeters (33 to 36 mm).

Similarly, when the input value of the half sum of A size and D size of the frame is indeed comprised between 330 and 360 tenth of millimeters, the level of consistency determined by the computer unit is high, for example set to 1. No alert signal is emitted.

When the input value of the half sum of A size and D size of the frame is not comprised between 330 and 360 tenth of millimeters, the computer unit determines that the level of consistency is low, for example set to 0. The computer unit then triggers the emission of the alert signal.

The method may then be implemented with any couple of parameters whose multivariate frequency distribution shows that they are correlated.

The level of consistency may also be determined as a function of the difference between the input value and a theoretical value taking into account the target range of values. It may for example be inversely proportional to this difference.

The invention claimed is:

1. A method for detecting with a computer unit a probable error in a set of data relative to a wearer and/or to a frame chosen by the wearer, at least one of these data being used for ordering an ophthalmic lens to be fitted into said frame for said wearer, said set of data comprising at least a value of a first parameter and a value of a second parameter different from said first parameter, said first and second parameters being relative to the wearer and/or a frame chosen by the wearer, and at least one of said first and second parameters being chosen among the following parameters:
   a parameter relative to the refraction features of at least one of the eyes of the wearer,
   a fitting parameter relative to the position of the chosen frame and/or of the ophthalmic lens relative to the eyes of the wearer,
   a morphologic parameter relative to the size and/or position of the features of the face of the wearer,
   a visual behavior and/or postural parameter relative to the behavior of the wearer during a visual task, or
   a geometric parameter relative to a dimension of the frame,
said method comprising the following steps:
   a) determining a level of consistency of said values of the first and second parameter with each other, based on a predetermined statistical consistency rule linking said first and second parameters, said predetermined statistical consistency rule taking into account
      a distribution function of said values of said first and/or second parameters, and
      a confidence interval determined based on said distribution function and determined by a quantile analysis of said multivariate frequency distribution, and
   b) emitting, based on this level of consistency, an alert signal in order to report a probable error.

2. The method for detecting an error according to claim 1, wherein, in step b), said signal is emitted when said level of consistency is below a predetermined minimal level.

3. The method for detecting an error according to claim 2, wherein, in step a), a probability for each parameter of having the corresponding value is determined, and the parameter whose value has the lowest probability is identified as the parameter exhibiting said probable error.

4. The method for detecting an error according to claim 1, wherein, in step b), a first signal is emitted when said level of consistency is below a first predetermined minimal level and at least a second signal is emitted when said level of consistency is below a second predetermined level, different from the first predetermined minimal level.

5. The method for detecting an error according to claim 4, wherein, in step a), a probability for each parameter of having the corresponding value is determined, and the parameter whose value has the lowest probability is identified as the parameter exhibiting said probable error.

6. The method for detecting an error according to claim 1, wherein, in step a), a probability for each parameter of having the corresponding value is determined, and the parameter whose value has the lowest probability is identified as the parameter exhibiting said probable error.

7. The method for detecting an error according to claim 1, wherein, in step a), said predetermined statistical consistency rule is determined based on a statistical multivariate frequency distribution function between said first and second parameters, obtained by collecting past values of said first and second parameters in each order received by an ophthalmic lens manufacturer during a predetermined period of time.

8. The method for detecting an error according to claim 7, wherein said predetermined statistical consistency rule takes into account a distribution of the numbers of orders as a function of the values of said first and/or second parameters or as a function of a factor depending on said first and/or second parameter.

9. A method for ordering lenses, comprising the following steps:
   determining a set of data for ordering said lenses,
   inputting said set of data into a computer,
   implementing the method for detecting a probable error according to claim 7, and
   in case an alert signal is emitted when implementing said method for detecting a probable error, checking said set of data.

10. The method for detecting an error according to claim 1, wherein, in step a), a theoretical value of the first parameter is determined based on said value of the second parameter and said predetermined statistical consistency rule comprises a comparison between said theoretical value and said value of the first parameter.

11. The method for detecting an error according to claim 10, wherein said comparison between said theoretical value and said value of the first parameter is made thanks to a graphical display of the theoretical value and the value of the first parameter.

12. A method for ordering lenses, comprising the following steps:
   determining a set of data for ordering said lenses,
   inputting said set of data into a computer,
   implementing the method for detecting a probable error according to claim 10, and
   in case an alert signal is emitted when implementing said method for detecting a probable error, checking said set of data.

13. The method for detecting an error according to claim 1, wherein said predetermined statistical consistency rule comprises comparing the value of the first parameter to a target interval of values determined based on said value of the second parameter.

14. A method for ordering lenses, comprising the following steps:
   determining a set of data for ordering said lenses,
   inputting said set of data into a computer,
   implementing the method for detecting a probable error according to claim 13, and
   in case an alert signal is emitted when implementing said method for detecting a probable error, checking said set of data.

15. The method for detecting an error according to claim 1, wherein, in step a), said predetermined statistical consistency rule takes into account a probability of having said value of the first parameter knowing a factor depending on the value of the second parameter, and/or a probability of having said value of the second parameter knowing a factor depending on the value of the first parameter.

16. A method for ordering lenses, comprising the following steps:
- determining a set of data for ordering said lenses,
- inputting said set of data into a computer,
- implementing the method for detecting a probable error according to claim 15, and
- in case an alert signal is emitted when implementing said method for detecting a probable error, checking said set of data.

17. A method for ordering lenses, comprising the following steps:
- determining a set of data for ordering said lenses,
- inputting said set of data into a computer,
- implementing the method for detecting a probable error according to claim 1, and
- in case an alert signal is emitted when implementing said method for detecting a probable error, checking said set of data.

18. A method for ordering lenses, comprising the following steps:
- determining a set of data for ordering said lenses,
- inputting said set of data into a computer,
- implementing the method for detecting a probable error according to claim 1, and
- in case an alert signal is emitted when implementing said method for detecting a probable error, checking said set of data.

* * * * *